(12) United States Patent
Shah et al.

(10) Patent No.: US 8,737,597 B2
(45) Date of Patent: May 27, 2014

(54) CALL PROGRESS ANALYSIS ON THE EDGE OF A VOIP NETWORK

(75) Inventors: Maulik Shah, San Jose, CA (US); Da C. Lin, San Leandro, CA (US); Mohammed Taher Shaikh, Fremont, CA (US); Farrukh Hassan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1130 days.

(21) Appl. No.: 12/360,699

(22) Filed: Jan. 27, 2009

(65) Prior Publication Data

US 2010/0189249 A1     Jul. 29, 2010

(51) Int. Cl.
*H04M 3/00*     (2006.01)

(52) U.S. Cl.
USPC .............................. 379/265.09; 379/265.01

(58) Field of Classification Search
USPC .............. 379/265.01–265.14, 266.01–266.1, 379/309, 243, 244; 370/352
See application file for complete search history.

(56) References Cited

U.S. PATENT DOCUMENTS

| | | | |
|---|---|---|---|
| 4,405,833 A | 9/1983 | Cave et al. | |
| 4,439,639 A | 3/1984 | Munter | |
| 4,450,320 A * | 5/1984 | Ostermann et al. | 379/45 |
| 4,686,699 A | 8/1987 | Wilkie | |
| 4,696,031 A | 9/1987 | Freudberg et al. | |
| 5,222,083 A | 6/1993 | Khouri et al. | |
| 5,400,621 A | 3/1995 | Smejda | |
| 5,726,984 A * | 3/1998 | Kubler et al. | 370/349 |
| 5,787,164 A | 7/1998 | Haines et al. | |
| 5,838,683 A * | 11/1998 | Corley et al. | 370/408 |
| 5,862,203 A * | 1/1999 | Wulkan et al. | 379/114.02 |
| 5,933,475 A | 8/1999 | Coleman | |
| 5,943,417 A | 8/1999 | Cox et al. | |
| 6,041,116 A * | 3/2000 | Meyers | 379/244 |
| 6,069,939 A * | 5/2000 | Fung et al. | 379/67.1 |
| 6,088,749 A | 7/2000 | Hebert et al. | |
| 6,118,864 A | 9/2000 | Chang et al. | |
| 6,188,751 B1 * | 2/2001 | Scherer | 379/88.22 |
| 6,188,760 B1 * | 2/2001 | Oran et al. | 379/230 |
| 6,208,970 B1 | 3/2001 | Ramanan | |
| 6,226,360 B1 * | 5/2001 | Goldberg et al. | 379/69 |
| 6,456,601 B1 * | 9/2002 | Kozdon et al. | 370/259 |
| 6,760,324 B1 | 7/2004 | Scott et al. | |
| 7,043,006 B1 | 5/2006 | Chambers et al. | |
| 7,139,380 B2 | 11/2006 | Burger | |
| 7,471,787 B2 | 12/2008 | Chambers et al. | |
| 7,555,114 B1 * | 6/2009 | Stahr | 379/265.01 |
| 7,881,712 B1 * | 2/2011 | Luo et al. | 455/422.1 |
| 7,907,708 B2 * | 3/2011 | Walker et al. | 379/93.09 |
| 2002/0176557 A1 * | 11/2002 | Burger | 379/207.02 |
| 2006/0159252 A1 * | 7/2006 | Chambers et al. | 379/265.02 |
| 2007/0135107 A1 * | 6/2007 | Boldt | 455/414.1 |
| 2008/0144792 A1 * | 6/2008 | Lavoie | 379/201.02 |
| 2009/0016497 A1 * | 1/2009 | Green et al. | 379/88.22 |
| 2009/0052641 A1 | 2/2009 | Taylor et al. | |
| 2010/0048191 A1 * | 2/2010 | Bender et al. | 455/416 |
| 2010/0272072 A1 * | 10/2010 | Bienn et al. | 370/335 |

* cited by examiner

*Primary Examiner* — William Deane, Jr.
(74) *Attorney, Agent, or Firm* — Brinks Gilson & Lione (57) ABSTRACT

A contact center is provided. The contact center includes a processor; and a memory in communication with the processor. The memory includes computer code executable with the processor. The computer code is configured to place a phone call through a media gateway to a communication device, receive a tone message from the media gateway, the tone message including a call progress event that defines a type of tone that was detected in the audio stream, determine a call treatment as a function of the communication device status, and perform call treatment for the phone call.

19 Claims, 6 Drawing Sheets

FIGURE 7

CALL PROGRESS ANALYSIS ON THE EDGE OF A VOIP NETWORK

FIELD OF TECHNOLOGY

The present embodiments relate to call progress analysis on an edge of a voice over internet protocol (VoIP) network.

BACKGROUND

Outbound dialers may be used to contact a communication device (e.g., a phone) used by a client or targeted customer. The outbound dialer may automatically dial a phone number associated with the communication device. An edge device, such as a media gateway, may be used to place the phone call. The edge device may receive an audio stream from the communication device. The audio stream may be a human voice, an answering machine tone, or other call progress tone. The edge device transfers the audio stream to the outbound dialer for call progress analysis. Transferring the audio stream from the edge device to the outbound dialer requires large amounts of bandwidth.

DETAILED DESCRIPTION

The present embodiments relate to call progress analysis that is performed on an edge of a contact center network or close to an edge of the contact center network. An edge device, such as a media gateway, receives an audio stream from a communication device in an external network. Instead of routing the audio stream to the contact center, the edge device may perform all, some, or none of the call progress analysis using a call progress analysis application located in the edge device. Accordingly, the audio stream may be processed without transmitting the audio stream through the contact center network. The contact center and the media gateway may communicate using a messaging session, such as a Session Initiation Protocol (SIP) messaging session or other Voice over Internet Protocol (VoIP) messaging session. Instructions, analysis, and results may be transmitted using the messaging session.

One benefit of using a call progress analysis application in the edge device to perform call progress analysis is that less bandwidth may be used. The audio stream does not have to be transmitted within the contact center network, for example, from the edge device to the contact center. Instead of transmitting the audio stream, the audio stream is processed on the edge of the contact center network and signals that require less bandwidth than the audio stream are communicated between the edge device and the contact center. Accordingly, bandwidth may be optimized.

Another benefit of using a call progress analysis application, which is located in the edge device, to perform call progress analysis may be that it frees computer processing unit cycles of the outbound dialer. Since the outbound dialer is not performing the call progress analysis, the outbound dialer may use computer processing unit cycles for additional processing.

As used herein, call progress analysis may include performing call progress, call analysis, or both call progress and call analysis. Call progress may include determining an outbound call's pre-connect information, which may include: busy, no answer, or circuit unavailable special information tone (SIT). Call analysis may include determining post-connect information about the destination party's media type, which may include detecting a voice, an answering machine, or a fax machine. Call progress analysis may include detecting tones to determine pre-connect information and/or post-connect information.

In one aspect, a contact center is provided. The contact center includes a processor; and a memory in communication with the processor. The memory includes computer code executable with the processor. The computer code is configured to place a phone call through a media gateway to a communication device, receive a tone message from the media gateway, the tone message including a call progress event that defines a type of tone that was detected in the audio stream, determine a call treatment as a function of the communication device status, and perform call treatment for the phone call.

In a second aspect, a media gateway is provided. The media gateway includes a processor; and a memory in communication with the processor. The memory includes computer code executable with the processor. The computer code is configured to receive an audio stream from a communication device, detect one or more call progress characteristics in the audio stream, determine a call progress event based on the one or more call progress characteristics, the call progress event defining a type of tone that was detected; and transmit a tone message to a contact center, the tone message including the call progress event.

In a third aspect, a method for treating a phone call is provided. The method includes establishing a messaging session with a contact center; receiving an audio stream from a communication device; detecting one or more call progress characteristics in the audio stream; determining a call progress event based on the one or more call progress characteristics, the call progress event defining one or more types of tones; and transmitting a tone message including the call progress event, such that the contact center may determine a call treatment based on the communication device status, without transmitting the audio stream from the communication device.

Figure 1:
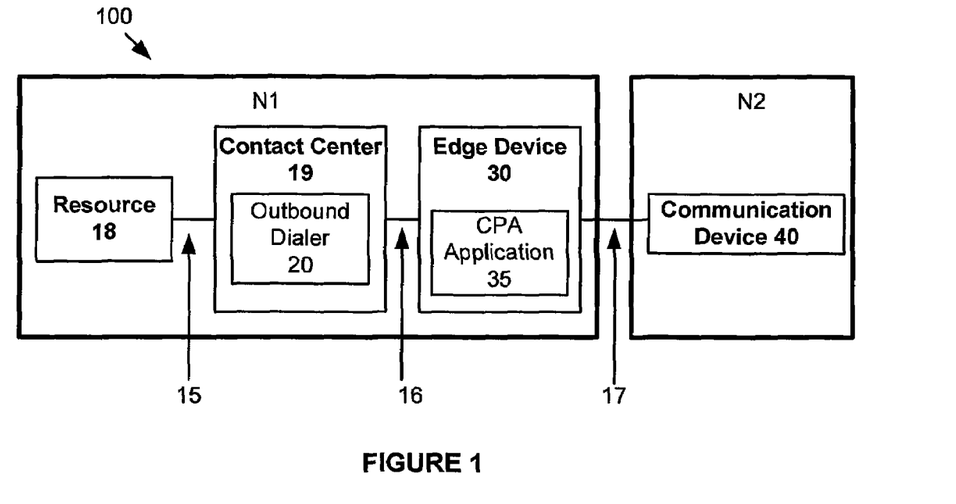
FIG. 1 illustrates one embodiment of a contact center system.

FIG. 1 illustrates one embodiment of a contact center system 100. The contact center system 100 includes a resource 18, a contact center 19, an edge device 30, and a communication device 40. The network 15 may couple the contact center 19 with the resource 28, and the network 16 may couple the contact center 19 with the edge device 30. The network 17 may couple the edge device 30 with the communication device 40. Herein, the phrase "coupled with" or "couple . . . with" includes directly connected to or indirectly connected through one or more intermediate components. Such intermediate components may include both hardware and software based components. For example, the contact center 20 may be indirectly connected to the edge device 30 through one or more routers or servers. In alternative embodiments, the contact center system 100 includes additional, different, or fewer components.

As shown in FIG. 1, the contact center 19 may include an outbound dialer 20 that automatically or manually places a phone call to the communication device 40. A phone call that is being placed from (e.g., an outgoing phone call) and/or to (e.g., an incoming phone call) the outbound dialer 20 may be routed through the edge device 30. In response to an outgoing phone call, the edge device 30 may receive an audio stream from a communication device 40 in a remote network N2. Instead of routing the audio stream to the outbound dialer 20, the edge device 30 may perform all, some, or none of the call progress analysis using a call progress analysis application 35 stored in the edge device 30. Accordingly, call progress analysis may be performed without transmitting the audio stream from the edge device 30 to the outbound dialer 20.

The contact center system 100 may be used to directly or indirectly connect the resource 18 with one or more communication devices 40. For example, when the communication device 40 answers an outgoing phone call, the contact center 19 may automatically transfer the phone call to the resource 18 or connect the resource 18 to the phone call. Alternatively, or additionally, the resource 18 may be manually connected to the phone call.

The networks 15, 16, and 17 are communication networks, Internet Protocol (IP) networks, Voice-over-Internet protocol (VoIP) networks, public switched telephone network (PSTN), packet-switched networks, or other now known or later developed communication networks. For example, the networks 15 and 16 may be VoIP networks and the network 17 may be a PSTN. As used herein, the VoIP is a protocol for the transmission of voice through the Internet or other packet-switched networks. Other protocols for such audio transmission through the Internet or other packet-switched networks may be used. The networks 15, 16, and 17 may be used to transmit and receive communication. For example, a session initiation protocol (SIP) message may be transmitted across network 16.

The contact center network N1 and remote network N2 are wide area networks, local area networks, personal area networks, or other networks of components. The contact center network N1 may be a network of components that are associated with the contact center 19 or edge device 30. For example, the network of components in the contact center network N1 may be owned, operated, controlled, or maintained by a contact center administrator(s). The network of components in the contact center network N1 may be geographically close or distant to each other. For example, when connected to the contact center 19 via an Internet Protocol (IP) network (e.g. when the network 15 is a VoIP network), the resource 18 may be located in a different city, state, or country as the contact center 19. The remote network N2 may be a service provider network, routing network, an external network or other network that is remote from or unassociated with the contact center network N1. Alternatively, or additionally, the external network N2 may be owned, operated, controlled, or maintained by someone other than the contact center administrator. For example, the remote network N2 may be a service provider network that includes a media gateway that couples the network 17 with the communication device 40.

The resource 18 may be a personal computer, phone device, video conferencing device, remote terminal, automated voice recognition system, or other device or person that supports the dialer 20. For example, the resource 18 may be a phone device used by a contact center agent (e.g., a telemarketer) to communicate with the communication device 40. In another example, the resource 18 is an automated voice recognition system that receives a voice stream and provides options based on the voice stream. Although FIG. 1 shows a single resource 18, in an alternative embodiment, a plurality of resources 18 may be provided. The contact center 19 may connect one or more of the plurality of resources 18 with one or more communication devices 40.

The contact center 19 may be a call processing center, a media processing center, a server, a router, or other system for processing media. The contact center 19 may be operable to connect a resource 18 with one or more communication devices 40. Connection may include contacting (e.g., calling, pinging, messaging, or mailing) one or more communication devices 40, analyzing communication from one or more communication device 40, transferring communication to a resource 18, and coupling the resource 18 with one or more communication device 40. For example, the contact center 19 may transfer a phone call to a resource 18.

The contact center 19 may include an outbound dialer 20, as shown in FIG. 1. In alternative embodiments, the contact center 19 may include additional, different, or fewer components. For example, in one embodiment, the outbound dialer 20 may be independent of the contact center 19. Alternatively, the outbound dialer 20 may be integrated with the contact center 19, such that the contact center 19 performs all or some of the functions of the outbound dialer 20.

Figure 2:
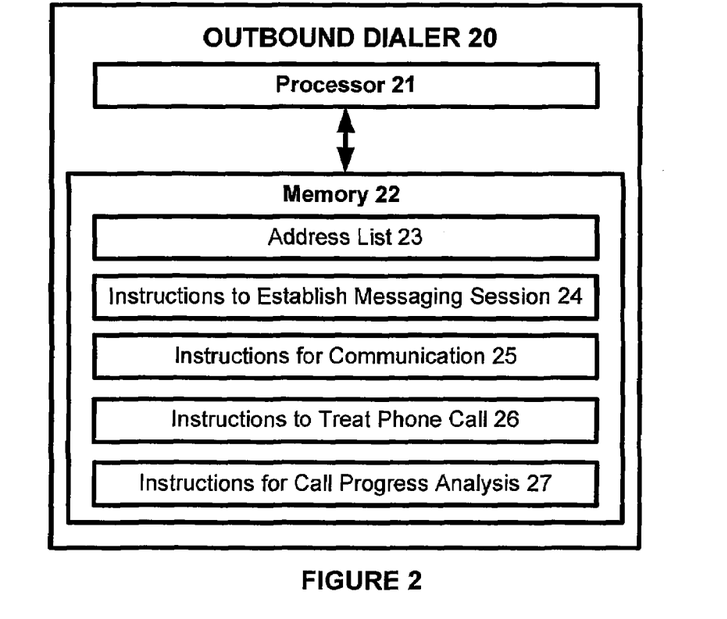
FIG. 2 illustrates one embodiment of an outbound dialer.

FIG. 2 illustrates one embodiment of an outbound dialer 20. The outbound dialer 20 includes a processor 21 and a memory 22. Additional, different, or fewer components may be provided. The outbound dialer 20 may be, for example, a predictive dialer, auto-dialer, contact dialer, computerized system that dials one or more telephone numbers, or other system for placing calls to one or more communication device 40. For example, the outbound dialer 20 may be a computerized system that automatically dials a batch or list of telephone phone numbers stored in an address list 23, which may be stored in memory 22.

The outbound dialer 20 is operable to communicate with the resource 18 and/or the edge device 30. Communication may include transmitting and receiving messages, signals, or data. The messages, signals, or data may be transmitted or received across networks 15 and/or 16, for example, using the processor 21.

The outbound dialer 20 is operable to establish a messaging session with the edge device 30. The messaging session may be a session initiation protocol (SIP) session, session description protocol (SDP) session, real time protocol messaging session, or other now known or later developed session used for communicating messages. To establish the messaging session, the outbound dialer 20, for example, using the processor 21, may transmit an invite message to edge device 30. The invite message may invite the edge device 30 to participate in a messaging session.

The outbound dialer 20 may use the invite message to setup call progress analysis in the edge device 30. Setting up call progress analysis in the edge device 30 may include inviting the edge device 30 to perform call progress analysis. In other words, the outbound dialer 20 may request whether the edge device 30 has call processing capabilities, for example, whether the edge device 30 has a call progress analysis application 35. The invite message may define one or more control parameters for call progress analysis. The invite message may specify one or more events that the edge device 30 should detect. If no events are listed in the message, call progress analysis in the edge device 30 may be disabled. Table 1 illustrates a few of the events that may be specified in the invite message.

TABLE 1

| Message ID | Event |
| --- | --- |
| FT | Fax/Modem Tone |
| Asm | Answering Machine Tone |
| AsmT | Answering Machine Terminate Tone |
| LS | Live Human Speech |
| SitIC | SIT tone IC - Intercept - Vacant No. or AIS. |
| SitNC | SIT tone NC - No Circuit, Emergency or Trunk Blockage |
| SitVC | SIT tone VC - Vacant Code |
| SitRo | SIT tone RO - Reorder Announcement |

Figure 3:
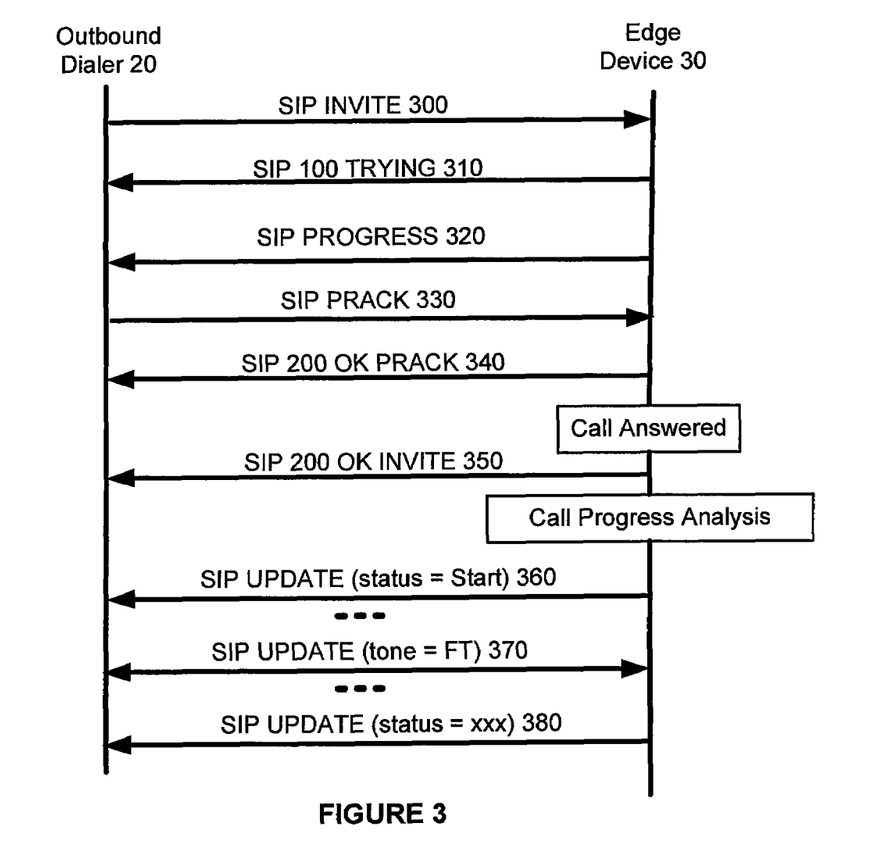
FIG. 3 illustrates one embodiment of communication between an outbound dialer and an edge device.
Figure 4:
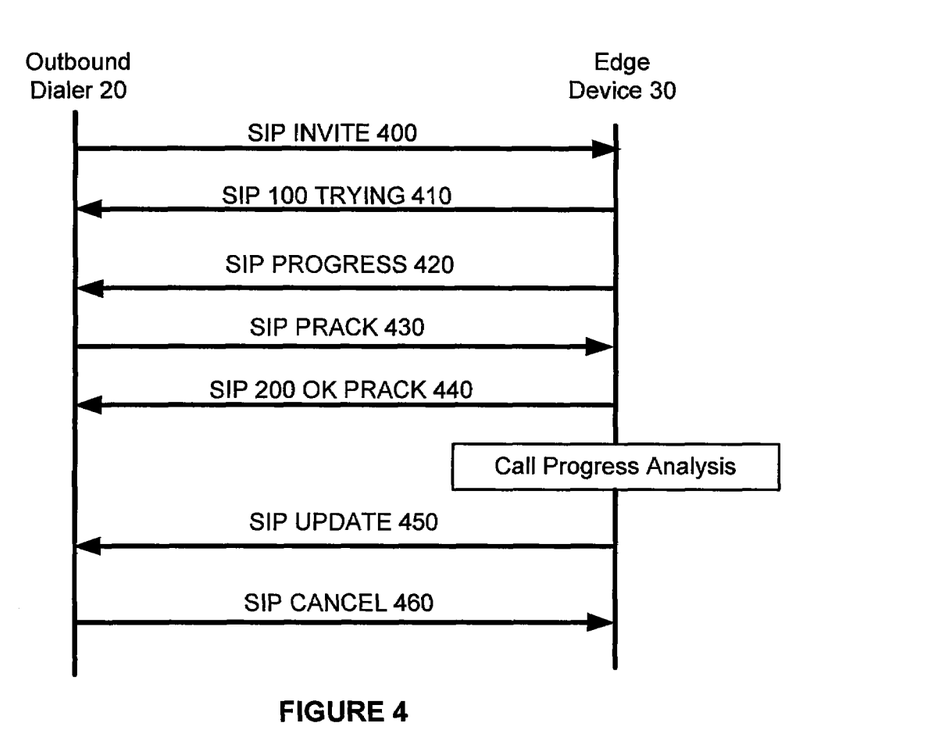
FIG. 4 illustrates another embodiment of communication between an outbound dialer and an edge device.

FIG. 3 and FIG. 4 illustrate two examples of using a messaging session for call progress analysis on the edge device 30. More specifically, FIG. 3 illustrates an example of using an SIP messaging session when a call progress event is detected after the phone call is connected. FIG. 4 illustrates an example of using an SIP messaging session when a call progress event is detected before the phone call is connected. The examples of FIG. 3 and FIG. 4 use a SIP messaging session; however, other messing sessions may be used.

In the example of FIG. 3, the outbound dialer 20 may transmit an SIP INVITE 300 message to the edge device 30. The SIP INVITE 300 message may include a call progress analysis (CPA) application content type (e.g., "application/x-cisco-cpa") that includes a list of parameters that control call progress analysis. One parameter that controls call progress analysis may be the events that the edge device 30 may, should, or does detect. For example, the SIP INVITE 300 message may specify that the edge device 30 is to detect a fax/modem tone, an answering machine tone, and an answering machine terminate tone. Accordingly, the CPA application content type may include a list such as: "Events=FT, Asm, AsmT". Other messaging sessions and/or messages may be used to set up call progress analysis in the edge device 30.

The outbound dialer 20 may prevent an audio stream from being sent from the edge device 30 to the outbound dialer 20 when a messaging session is being established or call progress analysis is being set up. Alternatively, or additionally, the processor 21 may prevent the outbound dialer 20 from receiving an audio stream when messaging session is being established. In other words, the outbound dialer 20 may black hole a real time protocol (RTP) stream by setting a connection address to 0.0.0.0. In other words, the outbound dialer 20 may prevent the edge device 30 from sending an audio stream while the messaging session is established. One benefit of preventing an audio stream from being sent while the messaging session is established is that network bandwidth is not used for unnecessary transmissions. This also helps in reducing processing at the contact center for these unnecessary RTP packets The outbound dialer 20 may receive one or more status update messages from the edge device 30, for example, using the messaging session. Exemplary status update messages may include start messages, tone messages, or other update messages. A start message may include, for example, a message that the phone call was connected and the edge device 40 has begun call progress analysis. A tone message may include a message that indicates the type of tone detected and/or communication device. For example, the tone message may indicate that an answering machine tone was detected. In another example, a first tone message may indicate that a fax machine tone was detected and a second tone message may indicate that a live human tone was detected. In the example of FIG. 3, the SIP UPDATE (status=start) 360 is a start message and the SIP UPDATE (tone=FT) 370 is a tone message indicating that a fax/modem tone was detected.

The one or more status update messages may include none (zero), some, or all of an audio stream received from the communication device 40. The one or more status update messages may be low-bandwidth messages, such as text-based messages. In the examples of FIG. 3 and FIG. 4, the one or more status update messages are SIP messages, for example, SIP UPDATE messages. In one example, a representative sample of the audio stream but not the entire audio stream may be sent to the outbound dialer 20 for confirmation and/or tone analysis. In another example, the status update message is a tone message that includes a communication device status, the communication device status indicating the operating status of the communication device.

The outbound dialer 20 may treat a phone call based on the one or more status update messages. Treating a phone call may include transferring/connecting the phone call (e.g., to a resource 15 or other communication device), disconnecting the phone call, or providing other call treatment. In one example, when a status update message indicates that an answering machine tone was detected (e.g., SIP UPDATE (tone=Asm)), the outbound dialer 20 may disconnect or initiate disconnection of the phone call, for example, by transmitting a disconnect message to the edge device 30. Upon receiving the disconnect message, the edge device 30 may disconnect the phone call. In another example, when a status update message indicates that live human speech was detected (e.g., SIP UPDATE (tone=LS)), the outbound dialer 20 may connect the phone call to a resource 18. Accordingly, a contact center agent may speak with the live human.

As shown in the example of FIG. 4, the edge device 30 receives an SIP INVITE 400 message from the outbound dialer 20. Once the invite message is received, the edge device 30 starts to setup the call and sends an SIP 100 TRYING 410 message to the outbound dialer 20. The edge device 30 transmits an SIP PROGRESS 420 message, such as a SIP 183 PROGRESS message, to the outbound dialer 20. The edge device 30 then waits for SIP PRACK 430 from the outbound dialer 320 before sending an SIP 200 OK PRACK 440 message. The edge device 30 may receive special information tone (SIT) tones, such as pre-call answered tones (e.g., a tone that is played when the dialed number does not exist), from the communication device 40. Once the SIT tone is received, the edge device 30 may transmit an SIP UPDATE 450 to the outbound dialer 20. The SIP UPDATE 450 may include a message that a SIT tone was received. The SIT tone may or may not be transmitted in the SIP UPDATE 450. The outbound dialer 20 may cancel the messaging session, for example, using an SIP CANCEL 460 message, when an SIT tone is received by the edge device 30.

The outbound dialer 20 may update an address list 23 based on the one or more status update messages. As used herein, "based on" may include as a function of, in accordance with, or depending on. The address list 23 may be updated to indicate the type of tone that was detected by the edge device 30. For example, when an answering machine tone is detected, the outbound dialer 20 may update the address list 23 to indicate that an answering machine was detected. Accordingly, the address list 23 may be updated such that the outbound dialer 20 will place a phone call to the answering machine's phone number at a later time, since there is a possibility that the live human is away for a period of time and will be available to answer the communication device 40 at a later time. In another example, when a fax machine tone is detected, the processor 21 may update the address list 23 to indicate that a fax machine answered the phone call. Accordingly, the address list 23 may be updated such that the outbound dialer 20 may no longer call the dialed phone number. In another example, the address list 23 may be updated to indicate that a live human answered the phone call and was transferred to a resource 18. Additional, different, or fewer lists may be updated based on the one or more status update messages.

The outbound dialer 20 may use a timer. The timer may be used to obtain data about contact processing analysis. For example, the timer may be started when a start message is received and stopped when a tone message is received. The amount of time between receiving the start message and the tone message may be stored for later analysis. In another embodiment, a timer may be used for cancelling phone calls. For example, a timer may be started when a call is placed. Once the timer reaches a predefined time, the processor 21 may tear down (disconnect) the phone call. Alternatively, or additionally, the timer may be started once a phone call is cancelled or torn down. The processor 21 may try the phone call again after a predefined time.

In one embodiment, for example, when the edge device 30 does not have the capabilities to perform call progress analysis, the outbound dialer 20 may perform call progress analysis using a call progress analysis application, which may be instructions for call progress analysis 27. For example, the outbound dialer 20 may directly or indirectly receive an audio stream from the edge device 30. The outbound dialer 20 may analyze the audio stream, which may include detecting tones in the audio stream. The outbound dialer 20 may determine whether to perform call progress analysis or allow the edge device 30 to perform call progress analysis.

The memory 22 may store an address list 23. The address list 23 is a phone list, IP address list, video conferencing address list, SIP address list, or a combination thereof. The address list may be used to contact the one or more communications devices 40. As used herein, a "list" may include a database, graph, or other set of organized information.

The memory 22 may store data representing instructions executable by the programmed processor 21. As shown in FIG. 2, the instructions may include instructions to establish a messaging session 24, instructions for communication 25; instructions to treat a phone call 26; and instructions for call progress analysis 27. Additional, different, or fewer instructions may be provided.

The instructions to establish a messaging session 24 may be executed to establish a messaging session with the edge device 30. Establishing the messaging session may include transmitting and receiving messages. The instructions 24 may be executed to transmit an invite message to the edge device 30. The invite message may include one or more parameters that control call progress analysis, such as events that should be detected during call progress analysis. The invite message may be used to request edge device capabilities, such as whether the edge device 30 has the capability to perform call progress analysis.

The instructions for communication 25 may be executed to communicate with the resource 18, the edge device 30, or other communication devices. Communication may include transmitting or receiving messages, signals, or data. The messaging session, which was established using the instructions 24, may be used for communication. Alternatively, or in addition to, the instructions 25 may be executed to transmit or receives messages using a different messaging system or protocol.

The instructions to treat a phone call 26 may be executed to treat a phone call. Treating a phone call may include connecting, transferring, or disconnecting a phone call. The instructions to treat a phone call 26 may include transmitting a disconnect message to the edge device 30. The instructions for call progress analysis 27 may be executed to perform call progress analysis. The instructions for call progress analysis 27 may be all, some, or none of a call progress analysis application.

Figure 5:
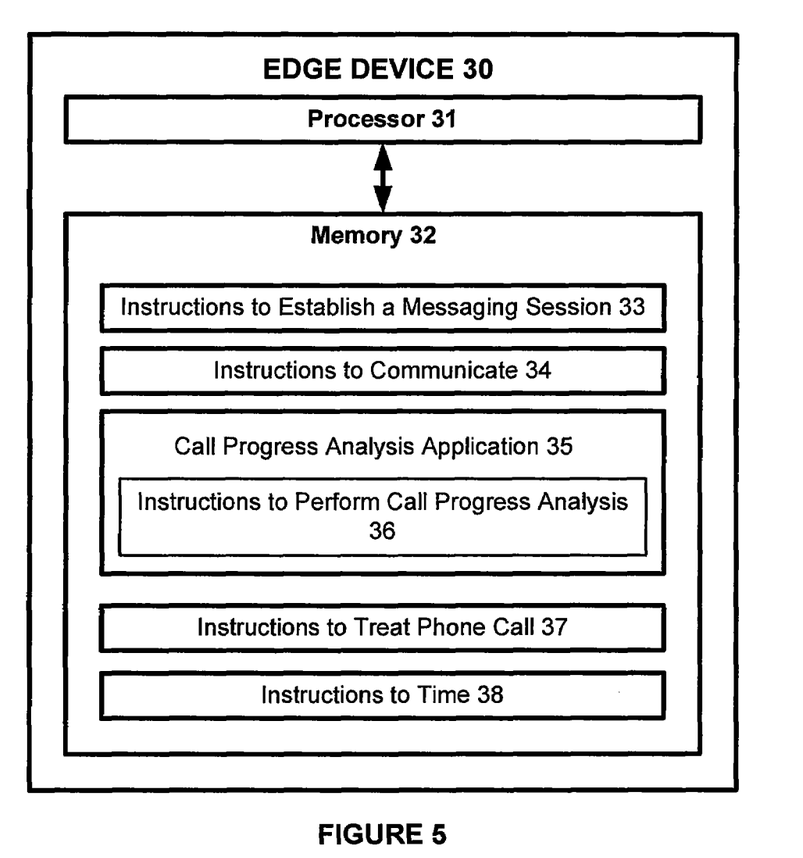
FIG. 5 illustrates one embodiment of an edge device.

FIG. 5 illustrates one embodiment of an edge device 30. The edge device 30 includes a processor 31 and a memory 32. Additional, different, or fewer components may be provided.

The edge device 30 is a media gateway, router, protocol converter, server, computer, switch, point of entry device, or other network node equipped for interfacing networks that use the same or different protocols. For example, as shown in FIG. 1, the edge device 30 may be a media gateway that is operable to communicate with the outbound dialer 20 or contact center 19 using network 16 (e.g., an IP network) and communicate with the communication device 40 using network 17 (e.g., a PSTN). The edge device 30 may be used to convert messages received from remote network N2 to messages that may be communicated in the contact center network N1.

The edge device 30 may be on or near the edge of the contact center network N1. As shown in FIG. 1, the edge device 30 may be connected such that the edge device 30 receives communication from communication device 40 prior to one, some, or all of the components of the contact center network N1, which may include the contact center 19, outbound dialer 20, and/or resource 18. Zero, one, or some components may be connected between the remote network N2 and the edge device 30. The edge device 30 may be the first device to receive the audio stream from the remote network N2, such that the audio stream does not have to be transmitted through the contact center network N1, once the audio stream is received by the edge device 30. In one example, the edge device 30 may not be the first component in the contact center network N1 to receive the audio stream. A second edge device may be used to receive the audio stream. All, some, or none of the audio stream may be transmitted from the second edge device 30b to a first edge device 30a for call progress analysis.

The processors 21, 31 are general processors, digital signal processors, application specific integrated circuits, field programmable gate arrays, analog circuits, digital circuits, combinations thereof, or other now known or later developed processors. The processors 21, 31 may be single devices or a combination of devices, such as associated with a network or distributed processing. Any of various processing strategies may be used, such as multi-processing, multi-tasking, parallel processing, remote processing, or the like. The processors 21, 31 are responsive to instructions stored as part of software, hardware, integrated circuits, firmware, micro-code or the like.

The edge device 30, for example, using the processor 31, may be operable to communicate with the contact center 19, outbound dialer 20, and/or one or more communication devices 40. For example, the edge device 30 may receive an invite message from the outbound dialer 20. In another example, the edge device 30 receives an audio stream from a communication device 40.

The edge device 30 may inform the outbound dialer 20 whether the edge device 30 is operable to perform call progress analysis. In order to inform the outbound dialer 20, the edge device 30 may transmit a progress message that defines the edge device's call progress analysis capabilities. For example, in the example of FIG. 3, the edge device 30 may transmit a progress message, such as a SIP PROGRESS 320 message that indicates whether the edge device 30 is capable of performing call progress analysis. The SIP PROGRESS 320 message may be a SIP 180, 183, or other 18× message.

The edge device 30 is operable to perform all, some, or none of the call progress analysis. Call progress analysis may include detecting one or more call progress characteristics in an audio stream (e.g., signal), which was received from the communication device 40. A call progress characteristic may include a frequency, temporal pattern, time, acoustic volume, or a combination thereof. For example, the edge device 30 may detect a frequency, for example, of 35.0 Hertz. In another example, the edge device 30 may determine the duration of a signal. In another example, the edge device 30 may detect a signal with a frequency of 480 Hertz, which lasts for 1 second.

The edge device 30 may determine a call progress event based on the one or more call progress characteristics. Determining a call progress event may include comparing the one or more call progress characteristics to a list or database of call progress characteristics. For example, as shown in Table 2, a frequency of 2100 Hz tone for more than 50 ms may be determined to be fax/modem tone. Table 2 illustrates a few examples of call progress events and call progress characteristics that may be detected after a call is connected.

TABLE 2

EVENTS DETECTED AFTER CALL IS CONNECTED

| Call Progress Event | Call Progress Characteristics |
|---|---|
| Fax/Modem tone | 2100 Hz tone for more than 50 ms |
| Answer Machine tone | Human Speech for more than 2500 ms |
| Answer Machine Terminate Tone. | Variable tones or beeps |
| Live human speech. | Continuous talk spurt (greater than 112 ms, but less than 2500 ms) followed by 375 ms of silence detected |
| Low volume or dead air call | Silence for 3 seconds (no tone, no voice) |

Table 3 illustrates a few examples of call progress events and call progress characteristics that may be detected before a call is connected. Other call progress events and/or call progress characteristics may be used.

TABLE 3

TONES DETECTED BEFORE CALL IS CONNECTED

| | Third Tone Frequency Duration | | Second Tone Frequency Duration | | First Tone Frequency Duration | |
|---|---|---|---|---|---|---|
| SIT Event | (ms) | (Hz) | (ms) | (Hz) | (ms) | (Hz) |
| Operator intercept | 380 | 1776.7 | 274 | 1370.6 | 274 | 913.8 |
| Vacant circuit (nonregistered number) | 380 | 1776.7 | 274 | 1370.6 | 380 | 985.2 |
| No circuit found | 380 | 1776.7 | 380 | 1370.6 | 380 | 913.8 |
| Reorder Announcement (Inter-LATA Carrier) | 380 | 1776.7 | 380 | 1370.6 | 274 | 985.2 |
| Reserved 1 | 274 | 1776.7 | 274 | 1428.5 | 380 | 913.8 |
| Reserved 2 | 380 | 1776.7 | 274 | 1428.5 | 274 | 985.2 |
| Reorder (system busy) | 380 | 1776.7 | 380 | 1428.5 | 274 | 913.8 |

The edge device 30 may transmit one or more status update messages to the outbound dialer 20. The one or more status update messages may include one or more call progress events. In one embodiment, the outbound dialer 20 determines how to treat the phone call based on the one or more status update messages. In another embodiment, the edge device 30 determines how to treat the phone call based on the call progress events. For example, when a live human voice tone is detected, the edge device 30 may transmit a connect message to the contact center 19 and/or outbound dialer 20. The contact center 20 and/or outbound dialer 20 may connect/transfer the phone call to a resource 18 when the connect message is received. In another example, the edge device 30 may disconnect a phone call, for example, when a fax/modem tone is detected.

The memory 22, 32 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 22, 32 may be a single device or a combination of devices. The memory 22, 32 may be adjacent to, part of, networked with and/or remote from the processors 21, 31.

The memory 22, 32 may be a computer readable storage media having stored therein data representing instructions executable by the programmed processors 21, 31. The memory 22, 32 stores instructions for the processor 21, 31. The processor 21, 31 are programmed with and executes the instructions. The functions, acts, methods or tasks illustrated in the figures or described herein are performed by the programmed processors 21, 31 executing the instructions stored in the memory 22, 32. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The memory 32 may store a database of call progress events, call progress characteristics, or both events and characteristics. The database may be compared to detected call progress characteristics to determine call progress events.

The memory 32 may store data representing instructions executable by the programmed processor 31. As shown in FIG. 5, the instructions may include instructions to establish a messaging session 33, instructions to communicate 34, instructions to perform call progress analysis 36, instructions to treat a phone call 37, and instructions to time 38. Additional, different, or fewer instructions may be provided.

The instructions to establish a messaging session 33 may be executed to establish a messaging session with the edge device 30. Establishing the messaging session may include transmitting and receiving messages. The messages may include receiving an invite message that defines parameters that control call progress analysis. The instructions 33 may be executed to transmit a progress message, which includes edge device capabilities, to the outbound dialer 20.

The instructions to communicate 34 may be executed to communicate with the resource 18, contact center 19, the outbound dialer 20, the communication device 40, or other communication devices. The messaging session may be used for communication. Alternatively, or additionally, the instructions to communicate 34 may be executed to transmit or receive messages using a different messaging system or protocol.

The instructions to perform call progress analysis 36 may be executed to perform call progress analysis, such as detecting call progress characteristics in an audio stream, determining a call progress event, and transmitting a status update message to the outbound dialer 20 using a messaging session. The instructions to perform call progress analysis 36 may be included in a call progress analysis application 35. The instructions 36 may be integrated with or separate from the call progress analysis application 35.

The instructions to treat a phone call 37 may be executed to treat a phone call. Treating a phone call may include connecting, transferring, or disconnecting a phone call based on call progress events. The instructions to treat a phone call 37 may include transmitting a connect message or a disconnect message to the outbound dialer 20.

Figure 6:
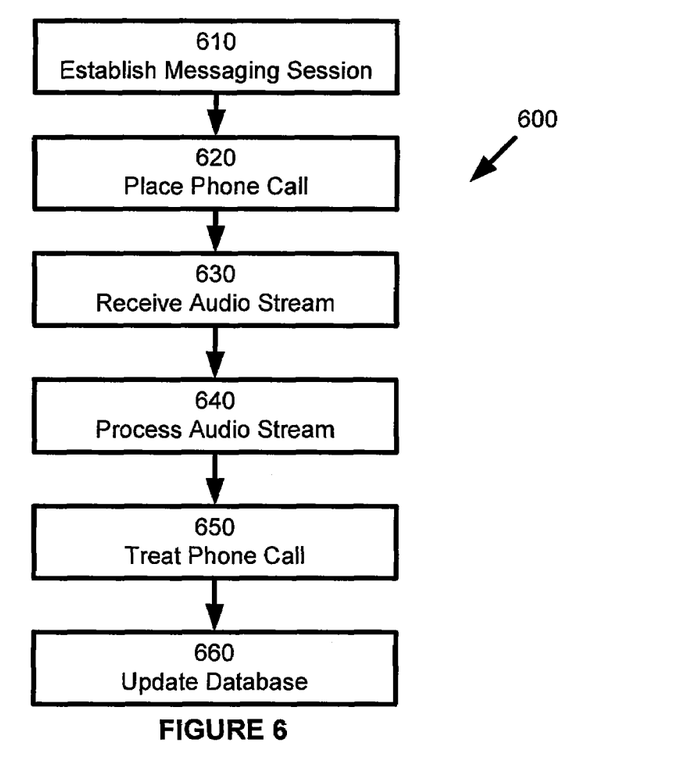
FIG. 6 illustrates one embodiment of a method for treating a phone call.

FIG. 6 shows one embodiment of a method 600 for treating a phone call. The method is implemented using the system 100 of FIG. 1 or a different system. The acts may be performed in the order shown or a different order. The acts may be performed automatically, manually, or the combination thereof.

As shown in FIG. 6, method 600 may include establishing a messaging session 610, placing a phone call 620, receiving an audio stream 630, processing the audio stream 640, and treating the phone call 650. The method 600 may include additional, different, or fewer acts.

In act 610, a messaging session is established between an outbound dialer and an edge device. Establishing a messaging session may include inviting the contact center or the edge device to join a messaging session, requesting edge device capabilities, providing edge device capabilities, and accepting an invitation to join a messaging session. Alternatively, the messaging session was previously established or is established without invitation.

Figure 7:
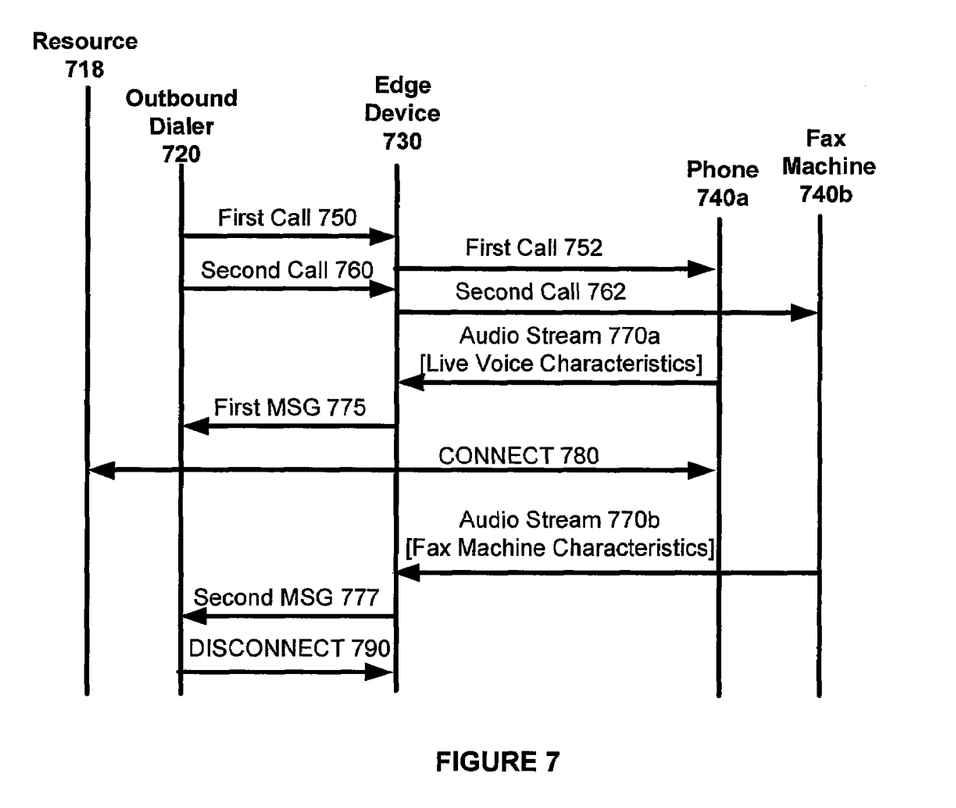
FIG. 7 illustrates an example of a method for treating a phone call.

In act 620, a phone call is placed to one or more communication devices. Placing a phone call may include reading one or more phone numbers from a phone list stored in memory and manually or automatically dialing the one or more phone numbers. The outbound dialer may access a phone list stored in memory. The outbound dialer may initiate contact with the addresses stored in address list. For example, as shown in FIG. 7, the outbound dialer 720 may place a first phone call 750 by dialing dial a first phone number and place a second phone call 760 by dialing a second phone number. The first phone call 750 and the second phone call 760 may be routed through the edge device 730 to the phone 740a and fax machine 740b.

In act 630, an audio stream is received from one or more communication devices. The audio stream may include one or more call progress characteristics, such as different frequencies and/or temporal patterns. For example, as shown in FIG. 7, audio stream 770a, which was received from phone 740a, may include live voice characteristics; and audio stream 770b, which was received from phone 740b, may include fax machine characteristics, such as an audio stream with a series of short, pulse tones.

In act 640, the edge device 740 processes the received audio stream using call progress analysis. Performing call progress analysis may include determining a call progress event based on the one or more call progress characteristics. Determining a call progress event may include determining a type of tone that was detected in the audio stream. Furthermore, processing may include generating a messaging session message that identifies the call progress event and transmitting the messaging session message to the outbound dialer 720. For example, as shown in FIG. 7, a first message (MSG) 775 may be transmitted from the edge device 730 to the outbound dialer 720. The first message 775 may include a message that a live voice event was detected in the audio stream 770a. A second message (MSG) 777 may be transmitted from the edge device 730 to the outbound dialer 720. The second message 777 may include a message that a fax machine event was detected in the audio stream 770b.

In act 650, a phone call is treated. Treating a phone call may include determining call treatment and performing call treatment. Determining call treatment may include reading call treatment from memory, comparing the call progress event to other call progress events, or processing a signal received from the edge device 730 or outbound dialer 720. For example, the outbound dialer 720 may read a rule from memory. For example, as shown in FIG. 7, the outbound dialer 720 may determine: When a live voice event is detected, the phone call should be connected to a resource. The first message 775 indicates that a live voice event was detected in the audio stream 770a. Accordingly, the phone call to the phone 740a is connected 780 to resource 718. Once connected 780, the resource 718 may communicate with the phone 740a. In another example, the outbound dialer 720 may determine: When a fax tone is detected, the phone call should be disconnected. The second message 777 indicates that a fax tone is detected. Accordingly, the second phone call 762 to the Fax Machine is disconnected using a disconnect message 790.

Performing call treatment may include transferring the phone call to a resource, connecting the phone call to a resource, disconnecting the phone call, or other type of treatment for servicing the phone call.

In act 660, a database is updated with the type of tone that was detected. An address list may be updated to indicate the type of communication device that was contacted. For example, a phone list may be updated to indicated that a fax machine was contacted, such that phone calls will not be sent to the fax machine in the future.

Various embodiments described herein can be used alone or in combination with one another. The a detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A contact center comprising:
   a processor; and
   a memory in communication with the processor, the memory including computer code executable with the processor, wherein the computer code is configured to:
   generate an initiation message for a phone call placed through a media gateway to a communication device, wherein the initiation message includes a list of a plurality of phone call events;
   transmit the initiation message from the contact center to the media gateway,
   wherein the media gateway receives an audio stream from the communication device, and the media gateway performs call progress analysis on the audio stream;
   receive a tone message at the contact center from the media gateway, the tone message including a call progress event that identifies a type of tone that was detected in the audio stream at the media gateway, wherein the type of tone indicates one of the plurality of phone call events occurred, and wherein the one of the plurality of phone call events indicates that a live human being or an answering machine answered the phone call;

determine a call treatment for the phone call at the contact center as a function of the tone message received from the media gateway and the one of the plurality of phone call events; and perform the call treatment for the phone call.

2. The contact center of claim 1, where the computer code is also configured to establish a messaging session with the media gateway from the contact center.

3. The contact center of claim 2, where the computer code is also configured to communicate with the media gateway using the messaging session, such that the audio stream from the communication device is not transmitted to the contact center from the media gateway.

4. The contact center of claim 1, where the call treatment includes connecting a contact center resource to the phone call when the type of tone that was detected indicates that a human voice was detected.

5. The contact center of claim 1, where the call treatment includes disconnecting the phone call when the type of tone that was detected indicates that a human voice was not detected.

6. The contact center of claim 1, where the computer code is also configured to update a media address list that includes a phone number of the communication device, and wherein the media address list is updated to include the type of tone that was detected.

7. A media gateway comprising:
a processor; and
a memory in communication with the processor, the memory including computer code executable with the processor, wherein the computer code is configured to:
receive a session initiation protocol (SIP) invite message defining a plurality of call progress events, wherein the SIP invite message is for a phone call;
receive an audio stream from a communication device after the phone call is connected,
detect one or more call progress characteristics in the audio stream,
determine an identified call progress event at the media gateway from the plurality of call progress events based on a tone in the one or more call progress characteristics, wherein the identified call progress event indicates whether a live person answered the phone call; and
transmit a tone message to a contact center from the media gateway, the tone message including the identified call progress event that indicates whether a live person answered the phone call.

8. The media gateway as claimed in claim 7, where the computer code is also configured to establish a messaging session with the contact center.

9. The media gateway as claimed in claim 8, where the messaging session is a SIP messaging session and the tone message is a SIP message.

10. The media gateway as claimed in claim 8, where the computer code is also configured to communicate using the messaging session, such that the audio stream from the communication device is not transmitted to the contact center.

11. The media gateway as claimed in claim 7, where determination of the identified call progress event includes a comparison of the one or more call progress characteristics to a list of predefined tone characteristics and types of tones.

12. The media gateway as claimed in claim 11, where the list of predefined tone characteristics and types of tones is stored in memory.

13. The media gateway as claimed in claim 7, where the tone message is transmitted to the contact center using a Voice over Internet Protocol network and the audio stream is received from the communication device using a public switched telephone network.

14. A method comprising:
establishing a messaging session between a contact center and an edge device for a phone call to a communication device;
receiving a first audio stream at the edge device from the communication device;
preventing transmission of the first audio stream from the edge device to the contact center by setting a connection address to a predetermined value;
receiving a second audio stream at the edge device from the communication device;
detecting one or more call progress characteristics in the second audio stream;
determining a call progress event based on the one or more call progress characteristics, the call progress event defining one or more types of tones included in the second audio stream; and
transmitting a tone message including the call progress event from the edge device to the contact center, the call progress event indicating that an answering machine answered the phone call, wherein the contact center determines a call treatment based on a communication device status, without transmitting the second audio stream from the communication device to the contact center.

15. The method of claim 14, where establishing a messaging session includes establishing a session initiation protocol (SIP) messaging session.

16. The method of claim 15, where transmitting the tone message includes transmitting a SIP message using the SIP messaging session.

17. The method of claim 14, where detecting one or more call progress characteristics includes detecting a frequency, temporal pattern, or volume.

18. The method of claim 14, further comprising:
comparing the one or more call progress characteristics to a database stored in memory.

19. The method of claim 14, further comprising:
updating an address list, such that the address list includes the one or more types of tones received from the communication device.

* * * * *